United States Patent
Oberst et al.

[15] 3,676,939
[45] July 18, 1972

[54] STUDENT RESPONDER TEACHING DEVICE

[72] Inventors: Charles V. Oberst; Glen C. Oberst, both of Norman, Okla.

[73] Assignee: EdAids, Inc., Norman, Okla.

[22] Filed: April 17, 1970

[21] Appl. No.: 29,620

Related U.S. Application Data

[63] Continuation-in-part of Ser. No. 744,940, July 15, 1968, abandoned.

[52] U.S. Cl. ..................................................35/48 R
[51] Int. Cl. ..................................................G09b 7/06
[58] Field of Search ............35/9, 48; 340/213.1, 13.2; 331/154, 155, 158, 171; 325/31, 335, 346; 329/122

[56] References Cited

UNITED STATES PATENTS 3,416,243  12/1968  Greenberg et al. .........................35/48
3,364,437  1/1968  Loposer et al. ..........................325/335

*Primary Examiner*—Robert W. Michell
*Assistant Examiner*—J. H. Wolfe
*Attorney*—Dunlap, Laney, Hessin & Dougherty

[57] ABSTRACT

An electronic device for use in facilitating the teacher-to-students communications during tutoring sessions. The device consists of a central control console which is operated by the teacher in conjunction with a plurality of individual transmitter units each used by a student to effect a response. Each student transmitter is capable of operating at a selected one of plural discrete frequencies which are indicative of a selected answer or choice selection, and the control console utilizes a heterodyne receiver with frequency scanning means capable of monitoring the required frequency spectrum. The control console also includes electronic circuitry for evaluating and displaying individual and group student information thereafter to provide further output of the data for computer and related data processing equipment.

11 Claims, 3 Drawing Figures

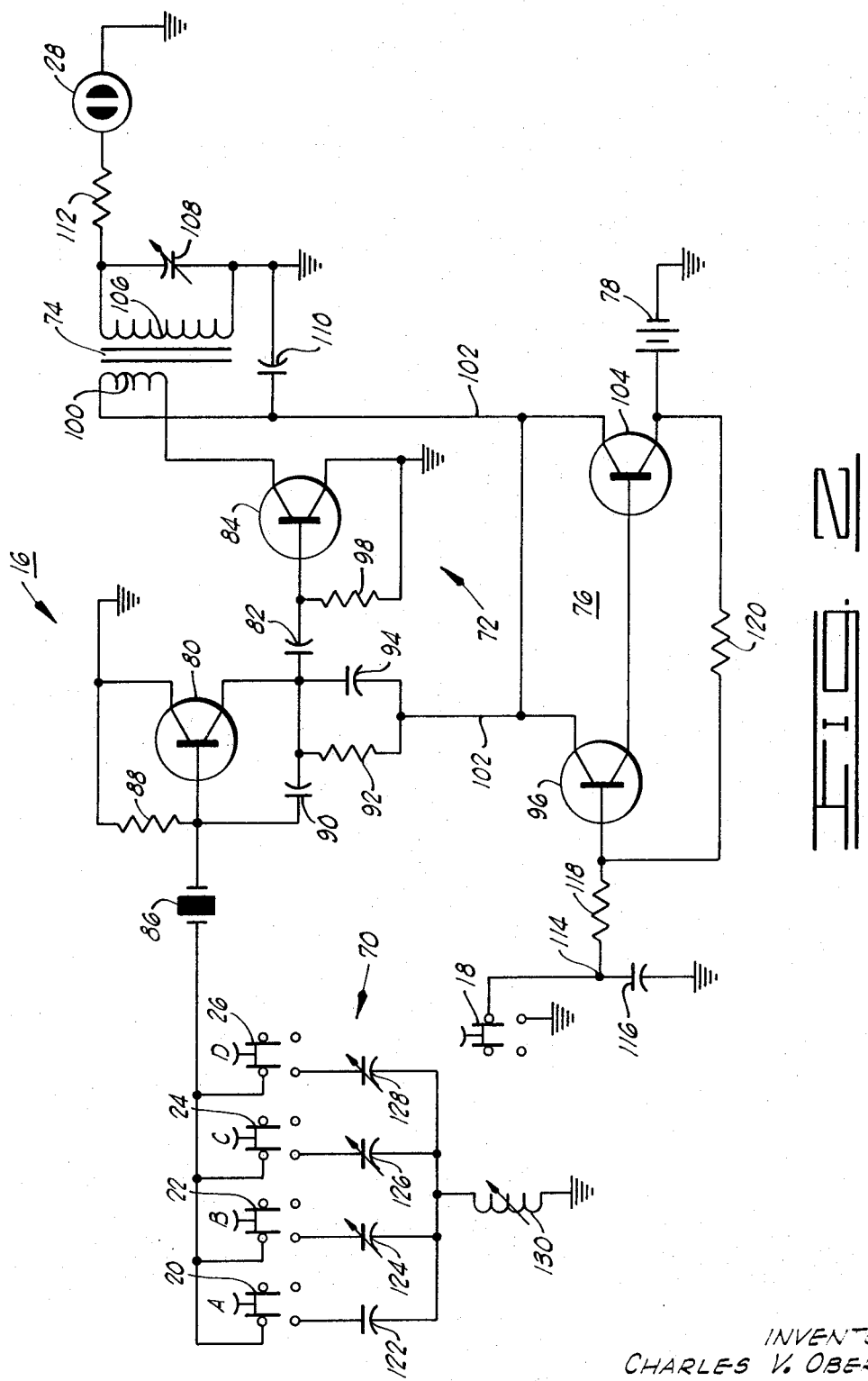

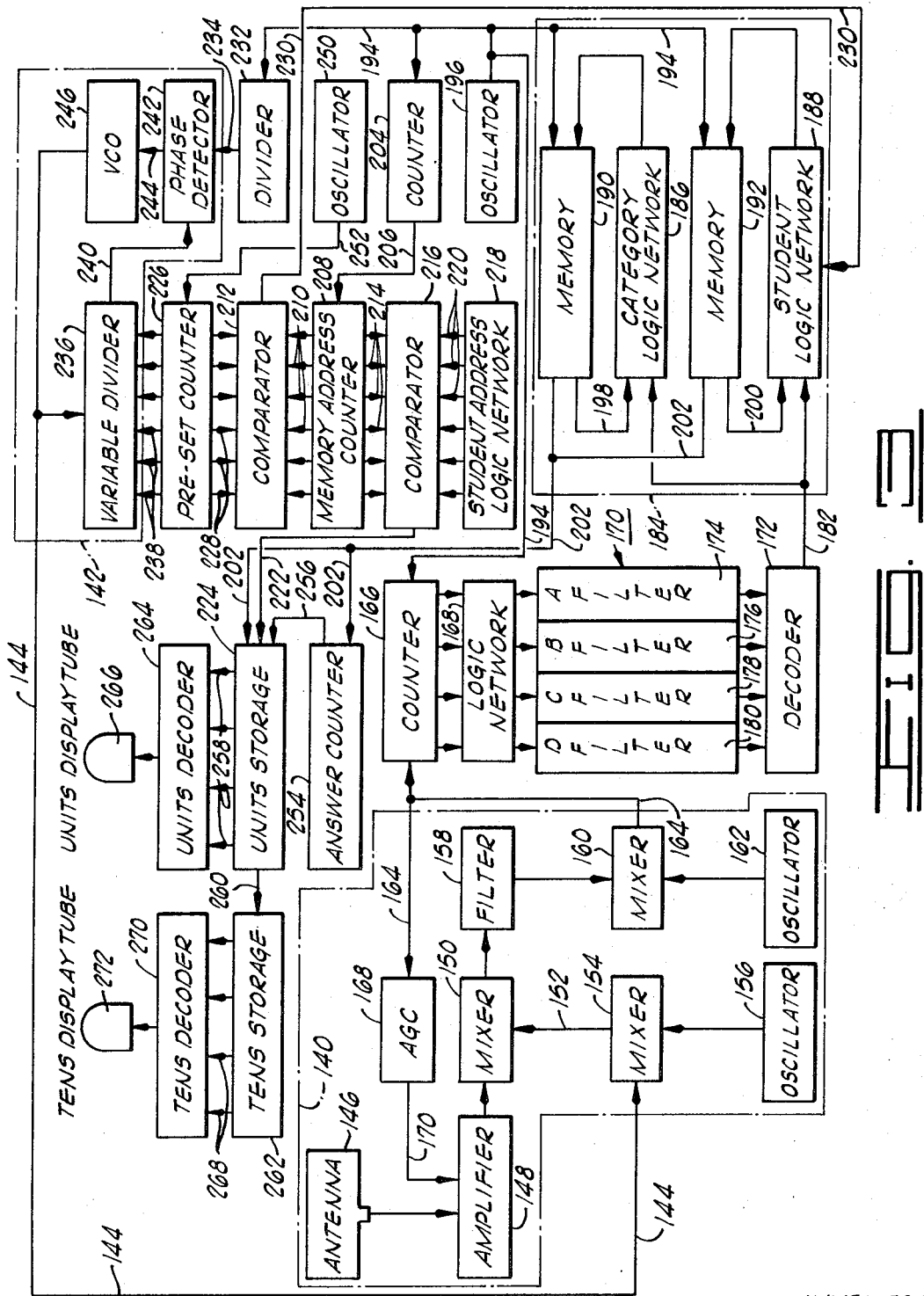

STUDENT RESPONDER TEACHING DEVICE

CROSS-REFERENCE TO A RELATED APPLICATION

The present application constitutes a continuation-in-part of the subject matter contained in U.S. Pat. application No. 744,940 entitled "Student Responder Teaching Device" and filed on July 15, 1968, now abandoned in the name of the present inventors.

BACKGROUND OF THE INVENTION

1. Field of the Invention

The invention relates generally to electronic educational devices and, more particularly, but not by way of limitation, it relates to an improved teacher-student response tally system which enables a continuing analysis and evaluation of the tutorial results.

2. Description of the Prior Art

The prior art includes many types of electronic and electromechanical systems and devices which function in a tutorial data exchange relationship as would find utility in the teaching field. More specifically, there are prior art devices which serve to monitor the student responses via student-central communication links, both wire and wireless. One form of such prior art apparatus is characterized by U.S. Pat. No. 3,416,243 which utilizes radio frequency transmission for interrogating student responses and recording transmitted replies. Reply recording is effected at a central control equipment which utilizes a mechanical print-out and tallying device operated in response to electrical signal input. This patent utilizes wireless interconnection as between the central receiver and individual transmitter units, with the intelligence being conveyed by tone modulation. The student interrogation, and recording of student replies, are mechanically controlled by electro-mechanical instrumentation including such as motors, gears and other mechanical elements.

Still another U.S. Pat. No. 3,378,937 sets forth a teaching device of the type which includes wire connection from the teachers console to each individual students desk, and such equipment is employed primarily for student response in relation to spelling-type testing. The master control panel of the system includes a frequency generating means which generates a unique signal for the primary purpose of providing basic reinforcement to the student when a selection is correct. Another U.S. Pat. No. 3,359,655 of interest in the area represents a typical form of student monitoring apparatus which includes provision of a wire connection as between each student position and the instructors console.

SUMMARY OF THE INVENTION

The present invention contemplates student response apparatus which serves to coordinate student-teacher response communication for a plurality of students through numerous sequential interrogations to enable continuing analytical data as to the overall group of students. In a more limited aspect, the invention consists of a console unit under operation of the teacher which receives transmitted student response energy indicative of pre-selected student responses to variously presented stimuli. The console includes a heterodyne receiver which is controlled electronically by a frequency scanning means to scan a spectrum of frequencies which would include all frequencies transmitted from the student positions. The control console also includes electronic means for gathering the response information for application to data processing networks which enable certain variations in numerical display of the student response information. Student response from each position is effected by means of a transmitter capable of operating at plural discrete frequencies, each indicative of a pre-selected student answer.

Therefore, it is an object of the present invention to provide a completely electronic student-teacher response system having inherent advantages of greater speed, shock resistance, noiseless operation and high reliability over comparable forms of mechanical system.

It is a further object of the invention to provide an apparatus for use in student-teacher response of sequential interrogation nature which provides data output compatible with electronic computers and/or additional data processing equipment.

It is still further an object of the present invention to provide such a classroom interrogation and registry system which utilizes modular construction techniques.

It is yet another object of the present invention to provide a wireless response system which will permit a plurality of students to communicate answers to a central teachers console which then displays, in numerical format, data relating to the students information acceptance and level of learning.

Finally, it is an object of the present invention to provide a student-teacher response system which enables the teacher upon interrogation to obtain information as to the number of students replying to a given question, the number of students who have replied correctly to the question, the number of students who reply in each possible answer category, the identification of students who have replied incorrectly to a question, and the total correct answers given by any individual student during an entire class period.

Other objects and advantages of the invention will be evident from the following detailed description when read in conjunction with the accompanying drawings which illustrate the invention.

BRIEF DESCRIPTION OF THE DRAWINGS

FIG. 2 is a schematic diagram of a student response unit; and

FIG. 3 is a block diagram of the control console.

DESCRIPTION OF THE PREFERRED EMBODIMENT

Figure 1:
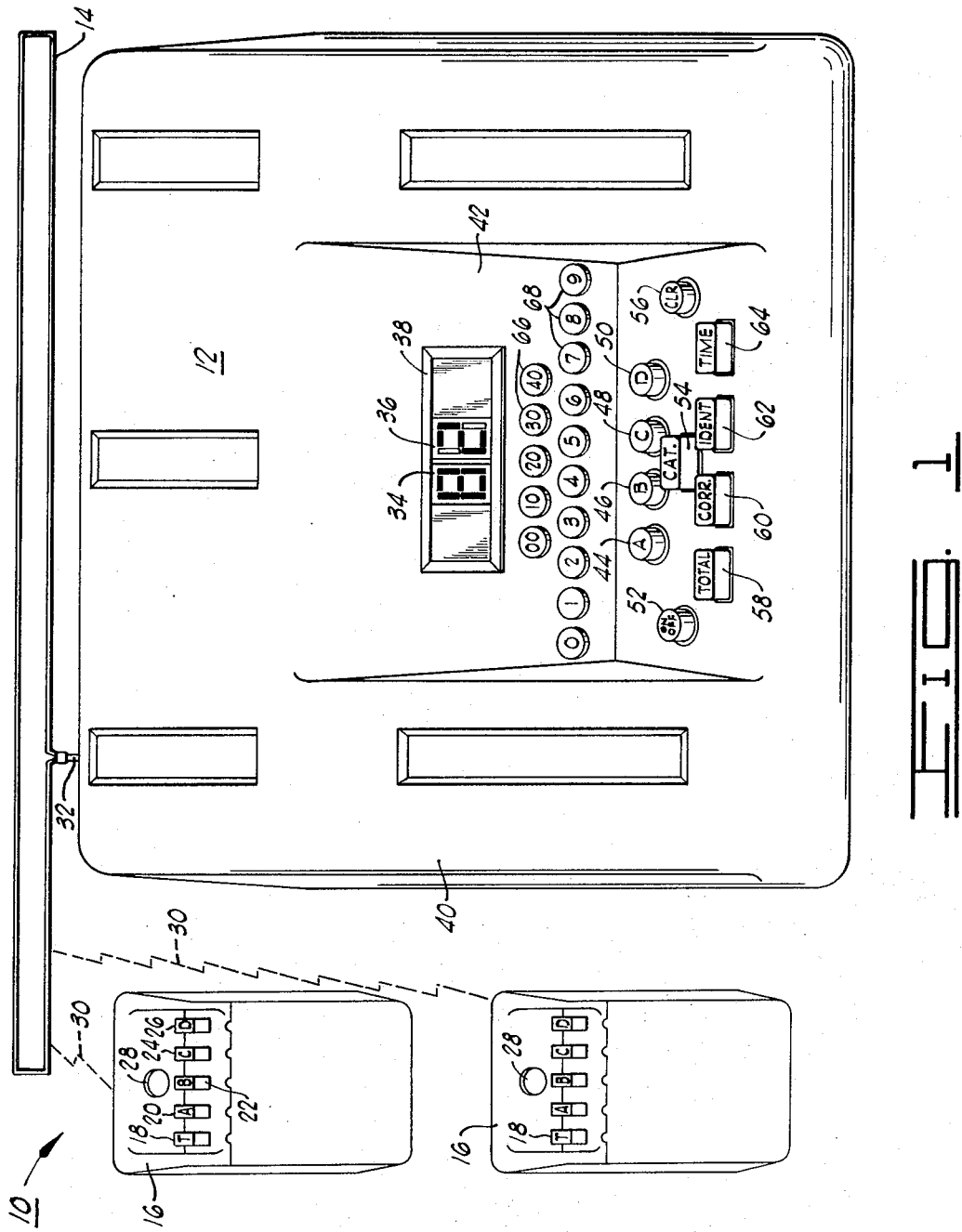
FIG. 1 is a perspective view of a teachers control console and a pair of individual student response units as constructed in accordance with the invention.

Referring now to FIG. 1, a teacher-student response system 10 consists of a control console 12 receiving transmitted radio energy by means of a receiving antenna 14, such radio energy emanating from one or more student response units or transmitters 16. Each of the student transmitters 16 broadcasts a discrete radio frequency when a respective transmit key 18 is depressed. The frequency transmitted is indicative of the particular student transmitting as well as the student answer choice. The answer choice is made by the student, in response to orally or visually related subject matter, by depression of a selected one of keys 20, 22, 24 or 26. A neon indicator lamp 28 is energized to glow during energy transmission. The radio energy transmission is then propagated as indicated by dashlines 30.

Radio transmission from the student transmitters 16 is then sensed by antenna 14 by conduction via connector 32 to associated circuitry within control console 12. The actual signal processing to derive and display desired data will be discussed further below with relation to FIG. 3. Such derived data is presented to the instructor or central operator by means of digital display tubes 34 and 36 as disposed for display viewing through a suitable escutcheon 38. The entire circuitry and components of control console 12 are housed within a case 40 as may be fabricated in well-known manner from suitable plastics or sheet metal materials. An upper surface of case 40 is formed into a front panel 42 for the purpose of providing seating for the various operational controls and the display escutcheon 38.

The operators panel 42 includes a plurality of push buttons 44, 46, 48 and 50 which serve to enable the teachers selection of the correct answer for evaluation in response system 10 for a particular question as presented orally, visually, printed, or however, A further switch 52 provides "ON-OFF" control of the control console 12, and a category push-button 54 identified as "CAT" enables interrogation of the total number of students who have responded with some form of answer, as will be further described below. The "CLR" push button 56 serves to clear the memory of the control console 12, as will be further described below, while further push buttons 58, 60, 62 and 64 serve to enable a plurality of display function selections. The "total" key 58 effects display of the number of students who have replied, with indication on the display tubes 34 and 36. Similarly, the "CORR" push-button 60 displays the quantity of correct answers given by a complete class, while depressing of "IDENT" push-button 62 initiates a presentation of the identity of students who have responded incorrectly. This presentation is done by sequentially display of student identification numbers upon display tubes 34 and 36. The "TIME" push-button 64 is energized to display a summation of correct answers for a particular student.

A student having a particular transmitter 16 at a given response location is selected by depression of the proper combination of a tens key 66 and a digits key 68. It may be noted from inspection of the keyboard of control console 12 that up to 49 students may be selected for inclusion within the functional operation of control console 12; however, it should be understood that the number of student buttons included, as well as the number of answer buttons, is a matter of choice which can be easily adjusted within the design requirements of the system by the skilled artisan. It is desirable too, if all of the tens push-buttons 66 are controlled unitarily so that only one can be depressed at any time; similarly, the units push-buttons 68 and the answer selection push-buttons 44, 46, 48 and 50 may be similarly constructed for singular push-button action.

In actual operation then, the control console 12 is capable of displaying on display tubes 34 and 36 the following information: the number of students who have replied; the number of students who have replied to each category $a$, $b$, $c$ or $d$; the number of students who have replied correctly; the identity of the students who have replied incorrectly; and, the total correct responses of any student for the complete class period or selected time-length.

Referring now to FIG. 2, the transmitter 16 consists of previously selected answer circuitry 70 providing input to oscillator circuitry 72 which drives a ferrite rod antenna 74. A power control circuit 76 is responsive to momentary grounding of the keying push-button 18 to enable circuit power from a suitable d-c power source 78 for a predetermined period of time, as will be further described below.

The oscillator circuitry 72 consists of a pnp transistor 80 which is connected as an oscillator to supply oscillating energy via coupling capacitor 82 to a power amplifier stage, and npn transistor 84. The base of transistor 80 is connected to an oscillating crystal 86 of selected frequency as well as through a resistor 88 to the collector and ground, and through a capacitor 90 to the emitter output lead and coupling capacitor 82. Energizing voltage is applied to the emitter of transistor 80 through a parallel-connected resistor 92 and capacitor 94 from the collector of a pnp transistor 96 within power control circuitry 76. As will be further described, the transistor 96 is periodically energized to supply energizing power output to transistor 80.

The oscillation output at coupling capacitor 82 is then applied to the base of transistor 84, connected grounded emitter, and a base biasing resistor 98 is connected to ground. The collector of transistor 84 is then connected through a winding 100 of ferrite antenna 74 which is connected in series with energizing voltage on lead 102 from the collector of power control transistor stage 104, also a pnp-type transistor. The ferrite antenna 74 also includes a secondary winding 106 and a trimming capacitor 108 is connected in parallel therewith. A capacitor 110 is connected across the entire power supply voltage between lead 102 and ground. A resistor 112 serves to limit current as applied across neon lamp 28, the front panel transmission indicating lamp.

The power control transistors 96 and 104 are pnp type and connected in series to be periodically energized by depression of the push-button 18 which serves to ground a junction point 114 in the base circuit of transistor 96. A capacitor 116 and a resistor 118 provide an R-C timing network which determines the duration of energization of the power control circuitry 76. The resistor 118 is connected between junction point 114 and the base of transistor 96 which has the emitter connected to the base of transistor 104, while the collector of transistor 96 is connected to supply lead 102 in parallel with the collector of transistor 104. Input power is applied at resistor 92 and capacitor 94, which provides energization power to the emitter pnp transistor 80, as well as via parallel lead 102 to the primary winding 100 of ferrite antenna 74.

A resistor 120 is connected between the positive terminal of power source 78 and the base of transistor 96 to provide a path for charging of capacitor 116 in preparation of the next subsequent energization. Thus, with capacitor 116 in its positive charged state, the bias of base transistor 96 will be positive by an amount sufficient to maintain transistor 96 as well as transistor 104 cutoff. Depression of push-button switch 18 momentarily grounds the junction point 114 and, therefore, the base of transistor 96 such that a more negative base potential allows conduction of transistor 96 and series-connected transistor 104 to provide energizing power on leads 102 to energize oscillator transistor 80 and power amplifier transistor 84. Even with release of push-button switch 18, the energizing power remains on leads 102 during re-charging of capacitor 116 through resistors 118 and 120. A period of about four seconds has been found to provide good operation. Then, upon obtaining a sufficiently positive voltage at junction point 114 the transistors 106 and 104 are once again cutoff.

The oscillation frequency of transistor 80 is controlled by selection of the inherent frequency characteristic of crystal 86 as well as a selected tuning circuit in series therewith. Thus, each of capacitors 122, 124, 126 and 128 are connected to be selectively enabled by respective push-button switches 20, 22, 24 and 26 to effect pre-determined response in combination with a grounded, series-connected variable inductance 130. The push button switches 20-26 are preferably selected from the type of switch which releases all switches except the one which is depressed, thereby to insure single-only operation.

Referring now to FIG. 3, the circuitry within control console 12 consists of a receiver section 140 and a frequency synthesizer 142, with the remainder of the circuitry comprising memory and logic circuitry which functions with the push-button control elements and data display devices on operator panel 42 of control console 12. Most of the circuitry, with the exception of the several stages of receiver 140, consist of commercially available forms of digital integrated circuits as will be more fully described hereinafter.

The receiver 140 is a double injection hetrodyne system. Receiver 140 is further characterized in that it is a band-switching receiver by virtue of the fact that it utilizes a reference frequency signal $f_o$, i.e., input on lead 144 from frequency synthesizer 142, to control one injection frequency $f_1$ within receiver 140. Thus, the reference frequency $f_o$ input on lead 144 is utilized to cause receiver 140 to switch to a different reception frequency each 80 milliseconds, as will be further described.

Transmitted radio energy, as from student response units or transmitters 16, is sensed by antenna 146 which then provides r-f signal input to amplifier 148. Amplifier 148 is suitably tuned to the selected transmitter frequencies $f_t$, and an amplified output is then applied to a first mixer 150. Signal energy in mixer 150 is hetrodyned with a signal at frequency $f_2$ as already derived on input lead 152 from a mixer 154. The mixer 154 hetrodynes input at frequency $f_1$ from a crystal-controlled oscillator 156 and the reference frequency $f_o$ signal on lead 144.

Hetrodyned output signal at frequency $f_3$ from first mixer 150 is then applied to a narrow-band filter 158 for the purpose of reducing harmonics and spurious signal content. Narrow-band frequency output from filter 158 is then applied to another mixer circuit 160 which hetrodynes the $f_3$ signal with selected output at frequency $f_4$ from another crystal-controlled oscillator 162 to provide a selected receiver output on lead 164 at frequency $f_5$. The $f_5$ output signal on lead 164 is applied to a counter circuit 166, to be further described, as well as to an automatic gain control circuit 168 which constructs a gain control voltage for application via lead 170 back to amplifier 148.

The relationship of frequencies and signal energy within receiver 140 are such that the output signal $f_5$ on lead 164 is derived as a function of several prior frequencies including the reference frequency $f_o$ signal on lead 144 and the transmission frequency $f_t$ signal as amplified in amplifier 148. In effect, the reference frequency $f_o$ signal input on lead 144 is subtracted from the $f_1$ signal output of oscillator 156 to generate a signal at frequency $f_2$ on lead 152. The output of amplifier 148, the transmitted signal frequency $f_t$, is then subtracted from the signal $f_2$ on lead 152 within mixer 150 to generate a first intermediate frequency signal $f_3$ as applied through filter 158 to mixer 160. This first intermediate frequency $f_3$ is then further heterodyned with an injection signal $f_4$ from oscillator 162 to derive a subtrahend output signal $f_5$ on lead 164.

The output signal on lead 164 is then digitally filtered through application to counter 166 and subsequent circuitry to be described. Counter 166 constitutes a conventional binary counter which provides four count-selective outputs to a logic network 168 which functions to examine the respective count output for application to a selected channel of a digital filter 170. Digital filter 170 consists of four channels responsive to A, B, C and D answer count and each provides respective output to a decoder stage 172. Actually, the digital filter consists of a plurality of counter circuits 174, 176, 178 and 180 which provide output to decoder 172 for proper signal formatting, e.g., further binary signal output and application of output signal on lead 182 to storage circuitry 184.

The count output indication on lead 182 is applied in parallel to each of respective logic networks 186 and 188 which serve to control the storage function of respective memory devices 190 and 192. Memory devices 190 and 192 are each 360-bit shift register devices but with necessary design and interconnection considerations they may be any of various commercially available types of small-capacity storage device. The respective logic networks 186 and 188 also consist of shift register circuitry for ordering information into storage and receiving information therefrom. Clock timing is provided via lead 194 from oscillator 196 as applied to respective memory devices 190 and 192, and the recycle of binary information through respective logic networks 186 and 188 is provided by branch leads 198 and 200. The output from respective memory devices 190 and 192 is then available via line 202 for further counting out for indication as will be described.

The oscillator 196 provides basic system timing, and it preferably consists of a crystal controlled oscillator capable of generating a precise output frequency. In the system generally referred to in the present specification, the crystal controlled oscillator 196 comprises a 1 MHz signal output, which output is applied via lead 194 to various circuit stages within the control console.

Thus, oscillator output on lead 194 is applied to a counter 204 which provides a pulse output via lead 206 to a memory address counter 208 at pre-determined intervals, as will be further described. The memory address counter 208 then provides a first plurality of output connections 210 to a comparator 212, and output is applied via a second plurality of output connections 214 to a comparator 216. The comparator 216 receives binary input information from a student address logic network 218 by means of plural input connections 220. The logic network 218 is mechanically linked to be responsive to depression of selected ones of the tens buttons 66 and units buttons 68 on the control console 12, i.e., the student address selection buttons. Student address information on input connections 220 is then compared with output from memory address counter 208, through comparator 216, and a comparator output lead 222 provides binary input information to a units storage circuit 224. Units storage 224 serves to examine the contents of a selected bit of binary information for each student code to compile or store data for totalization as will be further described below.

The comparator 212, having receiving binary input information from memory address counter 208, also receives input from a pre-set counter 226 via a plurality of input connections 228 to provide a binary comparator output on a lead 230 which is applied to the student logic network 188. The output from comparator 212 provides correlation between the student being interrogated and his proper memory address through student logic network 188 and the associated memory 192.

Still another output on lead 194 from crystal controlled oscillator 196 is applied to a counter-type divider 232 which applies output on a lead 234 to frequency synthesizer 142. Frequency synthesizer 142 consists of a variable divider network 236 which receives reference frequency $f_o$ from lead 144 as well as a plurality of binary information input connections 238 from pre-set counter 226. The output from variable divider 236 on lead 240 is then applied to a phase detector 242 which compares the input with lead 234 from divider 232. The output of phase detector 242, a variable voltage value, is present on lead 244 for application to a voltage controlled oscillator 246 which provides the output reference frequency $f_o$ on lead 144. Actually, the phase detector 242, voltage controlled oscillator 246 and the variable divider 236 form a phase-locked loop.

When locked, the loop controls $f_o$ so that it is equal to n times the basic frequency on lead 234 from divider 232. If n, the division ratio induced by variable divider 236, is equal to a particular frequency, the frequency synthesizer 142 will be locked at that frequency, thus, sequential changing of the division ratio n of the variable divider 236 will cause the voltage controlled oscillator 246 to step through the desired frequencies, as will be further discussed below. An oscillator 250 provides a constant frequency pulse output via lead 252 for control of pre-set counter 226 so that its configuration is changed each 80 milliseconds. The particular binary configuration will then determine the generation frequency of voltage controlled oscillator 246 each 80 milliseconds through alteration of the division ratio n of the variable divider 236.

An answer counter 254 is supplied via line 202 from respective memories 190 and 192. The answer counter 254 is also mechanically responsive to the front panel "time" button 64 for actuation to provide a count output via lead 256 to units storage 224. The units storage 224 also receives memory input from lead 202 as well as output on lead 222 from comparator 216 for logical treatment in accordance with desired operation, i.e., "total," "correct answers," and "identity." That is, the front panel buttons "total," "corr" and "ident," respectively, control logical sequencing of binary information through units storage 49, and units output is available on the binary output leads 258 while the tens output pulse is applied on a lead 260 to tens storage 262. The units output on leads 258 from units storage 224 is then applied to a units decoder network 264 which provides a decoded pulse output to drive a units display tube 266, a digital output tube such as the Nixie or such similar indicators. The tens storage 262 also provides a plurality of binary pulse outputs on output connections 268 to tens decoder 270 which, in turn, drives a tens display tube 272.

It should be understood that the various binary stages employed within the control console 12, and as illustrated in block form of FIG. 3, constitute module-type stages of commercially available construction. The various modules employed in actual constructed embodiments of the invention are of the integrated circuit type of structure which enable packaging of a large plurality of binary stages within a very small space. It follows too then, that the requisite structure and housing of the computative elements of the invention are all adequately packaged within a relatively small space.

OPERATION

The following operational description proceeds with a selected group of discrete frequencies which have been found to enable operation to good advantage. Thus, the frequency synthesizer 142 generates 40 discrete frequencies spaced at 1 KHz intervals from 2,554 KHz to 2,511 KHz. Of the inclusive frequencies the frequencies of 2,550; 2,540; 2,530; and 2,520 KHz are omitted from the schedule in order to prevent interference problems as could possibly be encountered with local broadcast station energy.

Forty discrete frequencies are also each allocated to a particular student response unit 16 so that scanning through the frequencies by 80 millisecond scan dwells of variable divider 236 and, therefore, output $f_o$ on lead 144, will enable detection of various relates frequencies in the receiver 140. Thus, for each transmitter response unit 16 replying, the antenna 146 input $f_t$ will include a particular base frequency plus the answer (A to D) frequency added thereon. That is, the base frequency will be determined by the particular crystal 86 in transmitter unit 16 and the answer frequency variation will be determined by the series-connected inductance 130 and the selected capacitor 122, 124, 126 or 128.

An an example, one set of frequency values which may be utilized in operation of the system are as follows:

$f_o$(KHz) = 2,554; 2,553; - - - through 2,511; (less the frequencies 2,550; 2,540; 2,530; and 2,520).

$f_t$(KHz) = 1,056 + 0.1M; 1,057 + 0.1M; - - - through 1,099 + 0.1M; (less frequencies 1,060 + 0.1M; 1,070 + 0.1M; 1,080 + 0.1M; and 1,090 + 0.1M).

M = a number of 1 to 4 which corresponds to a respective answer A through D, e.g., A = 1, B = 2, C = 3, and D = 4.

$f_1$ = 4,065 KHz
$f_2 = f_1 - f_o$
$f_3 = f_t - f_o$
$f_4$ = 452 KHz
$f_5 = f_3 - f_4$

The frequency synthesizer 142 is programmed to generate sequentially all forty desired frequencies every 3.2 seconds and to dwell on each frequency for eighty milliseconds. Thus, phase detector 242 generates a control voltage for voltage controlled oscillator 246 by comparing a basic frequency signal $f_a$ from divider 232 with the frequency $f_o$ divided by n, as provided by the variable divider 236. The base frequency $f_a$, which is 1 KHz, is generated by dividing the one MHz signal from crystal controlled oscillator 196 by 1,000 in divider 232. The division ratio n of the variable divider 236 is controlled by preset counter 74, i.e., the configuration of preset counter 226 is changed each 8 milliseconds by the introduction of a pulse from oscillator 250. The successive changes in division ratio n will then cause successive changes in the output frequency of variable divider 236 to cause sequential changing of the output frequency of voltage controlled oscillator 246. That is, with respect to the frequency range selected for this illustration, the output of voltage controlled oscillator 246 will step through the desired frequencies of 2,554 KHz to 2,511 KHz.

Output from the voltage controlled oscillator 246 is applied via lead 144 as a reference frequency $f_o$ signal for application to receiver 140. The receiver 140 receives a specific transmitter frequency from one of the student transmitters 16, a signal $f_t$ which is then amplified in receiver amplifier 148 for application of mixer 150. The reference frequency $f_o$ is then subtracted from a frequency $f_1$ from oscillator 156 and the difference frequency $f_2$ is applied to mixer 150. The transmitter frequency $f_t$ is then subtracted from injection signal at the frequency $f_2$ to generate a first intermediate frequency $f_3$. The signal at frequency $f_3$ is filtered and applied to mixer 160 along with a fixed frequency signal $f_4$ from oscillator 162 to derive a subtractive signal at the frequency $f_5$ present on lead 164 to counter 166.

The filter 158 may be such as a mechanical band-pass filter having a center frequency of 454.75 KHz and a pass band of plus or minus 200 Hz. Any signal outside of this narrow passband is sharply attenuated. Thus, signal f3 will pass through the filter 158 and into mixer 160 only if the signal $f_3$ is precise in nature. This condition is possible only when $(f_t + f_o - f_1)$ is 454.75 plus or minus 0.2 KHz; thus, for example, when the reference frequency signal $f_o$ is 2,544 KHz, only transmitter 1,056 + 0.1M KHz will be passed through the receiver 140. The scanning of variable reference frequency signal $f_o$ thus constitutes a means whereby it is possible to determine which particular student is transmitting its response. If $f_o$ is 2,554 KHz, and student NO. 1, who has a transmitter which can generate discrete frequencies 1,056 + 0.1m KHz, is transmitting a response, frequency $f_3$ will be one of four possible frequencies; $f_3$ will be 454.9 KHz if the answer is A, 454.8 KHz if the answer is B, 454.7 KHz if the answer is C, and 454.6 KHz if the answer is D. A signal of frequency $f_4$, 452 KHz, is subtracted from $f_3$ in mixer 160; thus, under the above situation, signal of frequency $f_5$ will be 2.9 KHz for answer A, 2.8 KHz for answer B, 2.7 KHz for C, and 2.6 KHz for answer D.

By changing the signal of frequency $f_1$ from oscillator 156, the system can be made to accommodate a different group of student transmitters. For example, if the frequencies of $f_t$ are from 1,056 to 1,099 KHz and if signal at frequency $f_1$ is 4.065 KHz for one group of 40 students, the mere changing of frequency $f_1$ to 4,115 KHz will enable a different group of student transmitters operating within the spectrum from 1,106, to 1,149 KHz to be accommodated by the same teaching console.

The output signal from receiver 140 at frequency $f_5$ is decoded in a digital filter to separate classify the various binary information codes. During the last 15 milliseconds of the 80 millisecond period during which voltage controlled oscillator 246 is generating the reference frequency $f_o$, counter 166 determines the duration of every other cycle of the receiver output signal at frequency $f_5$. Counter 166 counts the number of cycles of a 1 MHz signal, as obtained from oscillator 196, which occur during one cycle of frequency $f_5$; thus, by examining the number of counts in counter 166, logic network 168 can determine the actual frequency of $f_5$. Each cycle of the signal at frequency $f_5$ which is measured provides information as to the answer selected by the particular student. Thus, the digital filters 174 through 180 are able to count the number of times during the 15 millisecond period that frequency $f_5$ is 2.9 KHz, 2.8 KHz, 2.7 KHz, or 2.6 KHz, respectively.

In order to clarify, it may be supposed that $f_5$ is 2.9 KHz and that one cycle of 2.9 KHz would have a time duration of 345 microseconds. Counter 166 counts the number of pulses from a 1 MHz signal as obtained on lead 194 during the comparable cycle and, thus, counter 166 will contain 345 counts. After one cycle of $f_5$, the logic network 168 examines the contents of counter 60 and determines that this count is 345 plus or minus five. The filter 174 counts up one count each time a cycle of 2.9 KHz is measured. The second cycle of $f_5$ is ignored, but the third cycle is again measured as was the first, and filter 174 increases another count. This process continues for 15 milliseconds. If everything is in order at the end of 15 milliseconds, the filter 174 should have counted 21.

After the 15 millisecond interrogation period, the decoder 172 examines the contents of the respective filters 174 through 180 to determine which filter, if any, contains 16 or more counts. If one of the filters 174 through 180 contains 16 or more counts, then a signal is gated into student logic network 188 to indicate that the student being interrogated has replied to the question. A second signal is then generated by the decoder 172 indicating the accuracy of the answer. The accuracy is determined by comparing the answer chosen with the correct answer which the teacher has selected by depressing one of the correct answer buttons 44 through 50 on the console 12 thereby mechanically to adjust the logic configuration of decoder 172. This second signal which indicates the accuracy or the answer is gated to student logic network 188 for storage in the memory 192.

Each of forty students is allocated nine bits within the memory 192, and these bits serve to accommodate the information required for that one student. These nine bits comprise the total student address or memory location. Bit No. 1 contains the information as to whether the student has replied; but No. 2 denotes the accuracy of the student reply; bit Nos. 3, 4, 5, 6, 7 and 8 store the summation of the correct replies made by the student for the period in question; and an empty or "-buffer" bit No. 9 is utilized to precede bit No. 1 for each student to allow certain system operations to be completed before it is necessary to control the flow of information from a logic network 188 into the memory 192.

The memory address counter 208 serves to identify which student address is presently shifting through logic network 188. Each microsecond the memory 192 shifts its contents one bit position. Thus, in 360 microseconds, the complete content of the memory 192 has been shifted out of memory 192, through the logic network 188, and back into memory 192. The only bit of information which can be altered then is that which is presently shifting out of and back into, the memory 192 via logic network 188.

The counter 204 provides a pulse to memory address counter 208 every 9 microseconds. The configuration of memory address counter 208 identifies the student address presently shifting through logic network 188, and the counter 204 determines which particular bit of that student address is shifting through logic network 188. By comparing preset counter 226, which identifies the student being interrogated, with the binary content of memory address counter 208, which identifies the student memory address, the comparator 212 is able to correlate the student who is presently answering with that particular students correct memory address.

The logic network 218 assumes configuration for student addresses in response to depression of the mechanically linked tens and units buttons 66–68 relating to a selected student. Thus, logic network 218 is actuated to decode the particular student selected for display, and then to compare the selection with the configuration of memory address counter 208 which is counted down student address information relative to pulse output on lead 206. When the correct student address is available in logic network 188, the contents of bits Nos. 3 through 8 are examined and duplicated by answer counter 254 such that answer counter 254 takes on the same configuration as bits Nos. 3 through 8 of the desired student.

The contents of answer counter 254 are counted down by a 1 MHz signal. This same 1 MHz signal is gated into units storage 224 and on through into tens storage 262 such that exactly the same number of pulses as required to count down answer counter 254 to zero are gated into the respective units and tens storage 224 and 262. Units and tens storage 224 and 262 will then contain the summation of the correct answers of the selected student. This information is displayed through respective decoders 264 and 270 to display tubes 266 and 272.

During the time that the students are responding, memory 190 is storing information as to the category, i.e., answer buttons 44 through 50 on the front panel, which the student has chosen as being the correct answer. Logic network 186 controls the storage operation relative to the memory 190 in recycling configuration similar to that utilized with respect to student logic network 188 and associated memory 192. When the instructor wishes to know how many students have given the answer A as their selection, the answer button 44 and category button 16 are depressed and the total number of students who have given the answer A as their reply will be displayed on tubes 272 and 266. Similarly information is displayed upon interrogation for the categories or collective indications as to answer B, C, and D with depression of their respective answer buttons 46, 48 and 50.

The instructor can depress the "time" button 64 to indicate that a new question is then to be asked. The content of bit No. 2, the correct answer bit for each student, is then examined through answer counter 254. If a student has replied correctly, then a count of one is added to the summation contained in bits Nos. 3 through 8 and, at the same time, the bits Nos. 1 and 2, are erased to allow replies to the new question. The depression of "Total" push-button 58 allows summation as to the total number of students who have replied to the question displayed. Thus, depression of push-button 58 actuates unit storage 224 and tens storage 262 such that the contents of bit No. 1 of each student code is examined with subsequent totalizing of the quantity.

The "corr" push-button 60 may be depressed to actuate count as to bit No. 2 of memory 192. Thus, push-button 60 is depressed to enable memory 192 to tally the bit No. 2 status to derive an indication as to the number of students who have replied correctly to the immediate question before the students. Depression of the "ident" push-button 62 is utilized to cause sequential energization of units storage 224 and tens storage 262 in accordance with a sequence of student identification codes for those students who have replied incorrectly to the question presented.

The foregoing disclosed novel teaching apparatus which enables scoring or grading communications between a teacher and a group to be tutored. The apparatus has advantages of being able to provide instant tally as to various facets of the information presentation and testing procedure. Thus, the teacher of disseminator operating at the central console can interrogate one or more of the students to determine students answering correctly, percentage of students in the group answering correctly, the total of correct answers given by particular student during an information dissemination period, as well as other combinations of individual tallying and grading statistics.

The invention is considered desirable from the standpoint that it is a wireless system which is readily usable by a large group of students with little or no pre-wiring or setup procedure required. In addition, the invention utilizes radio frequency energy in such a manner that there is little or no possibility of interference with external or intra-building communications systems which may possibly be employed in close proximity. While the foregoing description describes the invention with respect to a particular frequency domain or schedule, it should be understood that there are a wide range of frequencies which may be employed in enabling proper operation of the apparatus.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A system of communication between an instructor and one or more students for registering multiple choice student response to one or more response situations, comprising:

plural student response transmitters each having plural answer keys, oscillator means for transmitting continuous wave radio energy at respectively different and progressively higher predetermined discrete frequencies so as to identify each of said response transmitters and the particular multiple choice response selected by a student at each of said response transmitters; and a control console for receiving said transmitted continuous wave radio energy from all said transmitters, said control console including frequency synthesizer means for generating periodic, successive reference frequency signals at discrete, progressively higher frequency values means for comparing said transmitted and reference discrete frequency signals;

automatic scanning means in said control console adapted to dwell at each of said different and progressively higher discrete frequences so as to sample and identify each of said student responses transmitted to determine the student unit and selected answer response for each of said plural student response transmitters.

2. A system as set forth in claim 1 wherein each of said plural student response transmitters comprises:

oscillator and output amplifier means driving an antenna which radiates transmitted radio frequency energy;

crystal means connected to the input of said oscillator to cause oscillation at a characteristic frequency for the particular student transmitter; and plural resonant circuits selectively actuatable in accordance with a predetermined student response for connection in series with said crystal means to cause pre-selected alteration of said transmitted radio frequency energy in accordance with student response selection.

3. A system as set forth in claim 1 wherein said console means comprises:

frequency synthesizing means generating sequentially a plurality of reference frequency signals;

input means receiving said transmitted radio frequency energy to generate a radio frequency signal which may include each of said transmitted radio energy signals from said plural student response transmitters;

mixer means receiving as inputs each of said radio frequency signals as well as said successive reference frequency signals to provide a characteristic answer output signal indicative of the particular transmitter responding.

4. A system as set forth in claim 3 wherein each of said plural student response transmitters comprise:

oscillator and output amplifier means driving an antenna which radiates transmitted radio frequency energy;

crystal means connected to the input of said oscillator to cause oscillation at a characteristic frequency for the particular student transmitter; and plural resonant circuits selectively actuatable in accordance with a predetermined student response for connection in series with said crystal means to cause pre-selected alteration of said transmitted radio frequency energy in accordance with student response selection.

5. A system as set forth in claim 3 wherein said frequency synthesizing means comprises:

voltage controlled oscillator means providing said reference frequency output signal;

variable divider means receiving said reference frequency output signal to provide a plurality of sequential output control signals of predetermined duration and successive frequency difference;

oscillator means generating a reference control signal; and phase detection means receiving said output control signal for comparison with said reference control signal to generate an output voltage value for application to said voltage controlled oscillator means to control the output frequency thereof.

6. A system as set forth in claim 3 wherein said input means comprises:

antenna means for sensing said transmitted radio frequency energy to provide a radio frequency input signal; and radio frequency amplifier means receiving said radio frequency input signal to provide an output radio frequency signal to said mixer means.

7. A system as set forth in claim 3 wherein said mixer means comprises:

oscillator means providing a fixed frequency output;

first mixer means receiving said successive reference frequency signals and said fixed frequency signal to provide as output a first mixer output signal;

second mixer means receiving said radio frequency signal from said input means and said first mixer output signal to produce a second mixer output signal which is characteristic of the particular transmitter responding.

8. A system as set forth in claim 7 wherein said mixer means is further characterized to include:

second oscillator means providing a second fixed frequency output signal;

third mixer means receiving said second mixer output signal and said second mixer frequency output signal to provide a third mixer output signal which is characteristic of the particular transmitter responding;

counter means receiving said third mixer output signal to provide a plurality of count outputs;

logic means receiving each of the plural count outputs to derive respective outputs indicating the particular one of the multiple choice student responses registered by a student.

9. A system as set forth in claim 8 which is further characterized to include:

digital storage means including an input logic network for receiving digital output from said logic means to provide continual binary storage of successive multiple choice response selections; and comparator means receiving input which is harmonically related to said reference frequency signal from said frequency synthesizing means to provide comparator output to said logic network to identify the particular discrete frequency of transmitted radio energy and therefore the student making said response selection.

10. A system as set forth in claim 9 which is further characterized to include:

switching means for interrogating said storage means to provide digital output indicative of student response selection for each student;

digital display means for receiving said interrogated output digital signals to provide visual readout of the desired information.

11. A system as set forth in claim 8 which is further characterized to include:

digital filter means including counter input means for receiving said third mixer output signal to determine presence of one of a plurality of narrow-band frequency components in said third mixer output signal; said filter means providing digital output indicating the response selection;

decoder means receiving said digital output signal to provide a digital output indicating answer selection.

* * * * *